United States Patent [19]

Dixon

[11] 3,716,704
[45] Feb. 13, 1973

[54] ELECTRICAL CONTROL SYSTEM
[75] Inventor: Kenneth P. Dixon, Lakewood, Colo.
[73] Assignee: Systems Engineering Associates, Inc., Wheat Ridge, Colo.
[22] Filed: July 8, 1970
[21] Appl. No.: 53,197

[52] U.S. Cl..........235/92 PD, 235/92 R, 235/92 EV, 235/92 T, 101/39
[51] Int. Cl..............................................G06m 3/14
[58] Field of Search.340/174.1 K; 235/92 SH, 92 PB, 235/92 T, 92 DN, 92 CV, 92 CC

[56] References Cited

UNITED STATES PATENTS

| 3,564,216 | 2/1971 | Laycak | 235/92 PD |
| 3,584,200 | 6/1971 | Layman | 235/92 SH |
| 3,591,776 | 7/1971 | Sylvester | 235/920 N |

Primary Examiner—Maynard R. Wilbur
Assistant Examiner—Robert F. Gnuse
Attorney—Bertha L. MacGregor

[57] ABSTRACT

An electrical control system for automatically controlling operations on successively fed workpieces in a variable speed machine, comprising a workpiece scanning sensor, a rotating timing wheel provided with one or more sets of electrically countable devices, each set consisting of a predetermined number of said countable devices equi-spaced apart circumferentially on the wheel or a segment thereof, said wheel revolving at a speed which causes a set of said countable devices to pass one workpiece station in one revolution or a predetermined part of one revolution of the wheel depending on the number of sets of said devices on the wheel, and including a mark sensor, a count sensor, and count-up and count-out counters connected to the count sensor for counting the timing wheel devices to measure the speed of operation of the machine and to measure the lead time and for generating a signal at the end of the lead time, the combined counts of the count-up and the count-out counters being equal to the output of one set of said countable devices.

8 Claims, 7 Drawing Figures

BLOCK DIAGRAM – LEAD COMPUTATION SYSTEM

INVENTOR.
KENNETH P. DIXON
BY
Bertha L. MacGregor
ATTORNEY

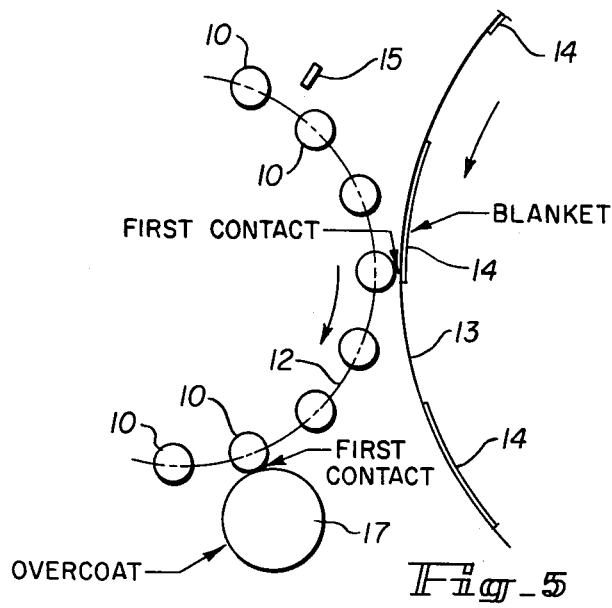
Fig_5
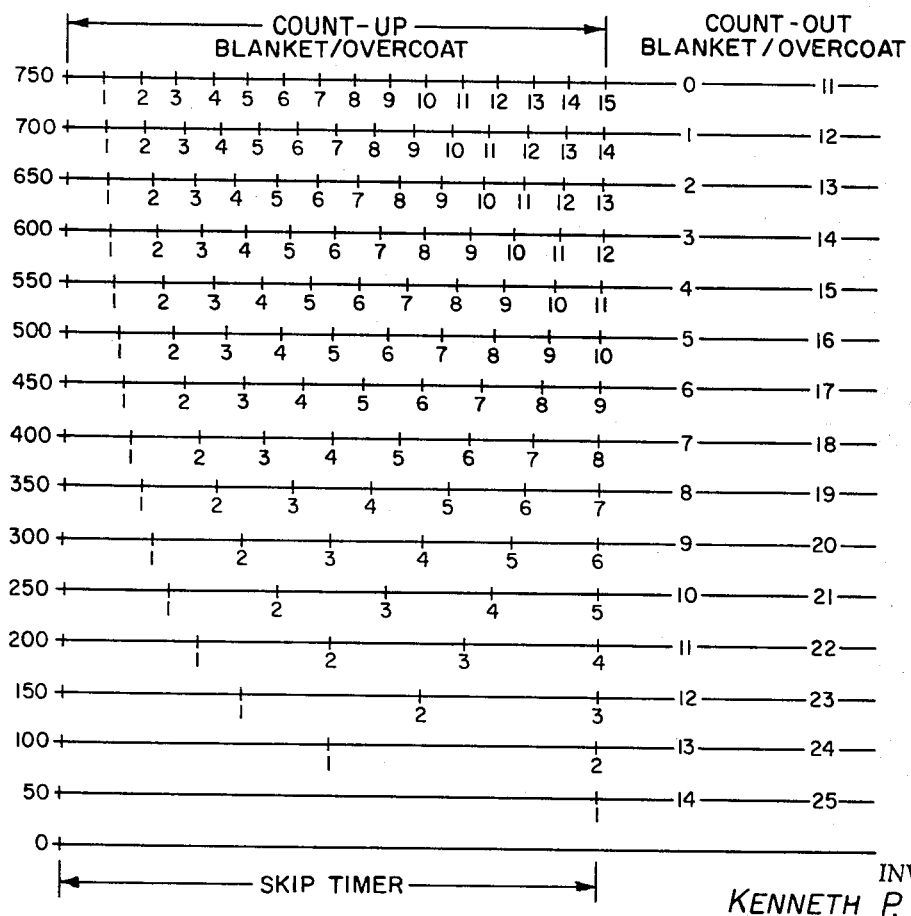
Fig_6

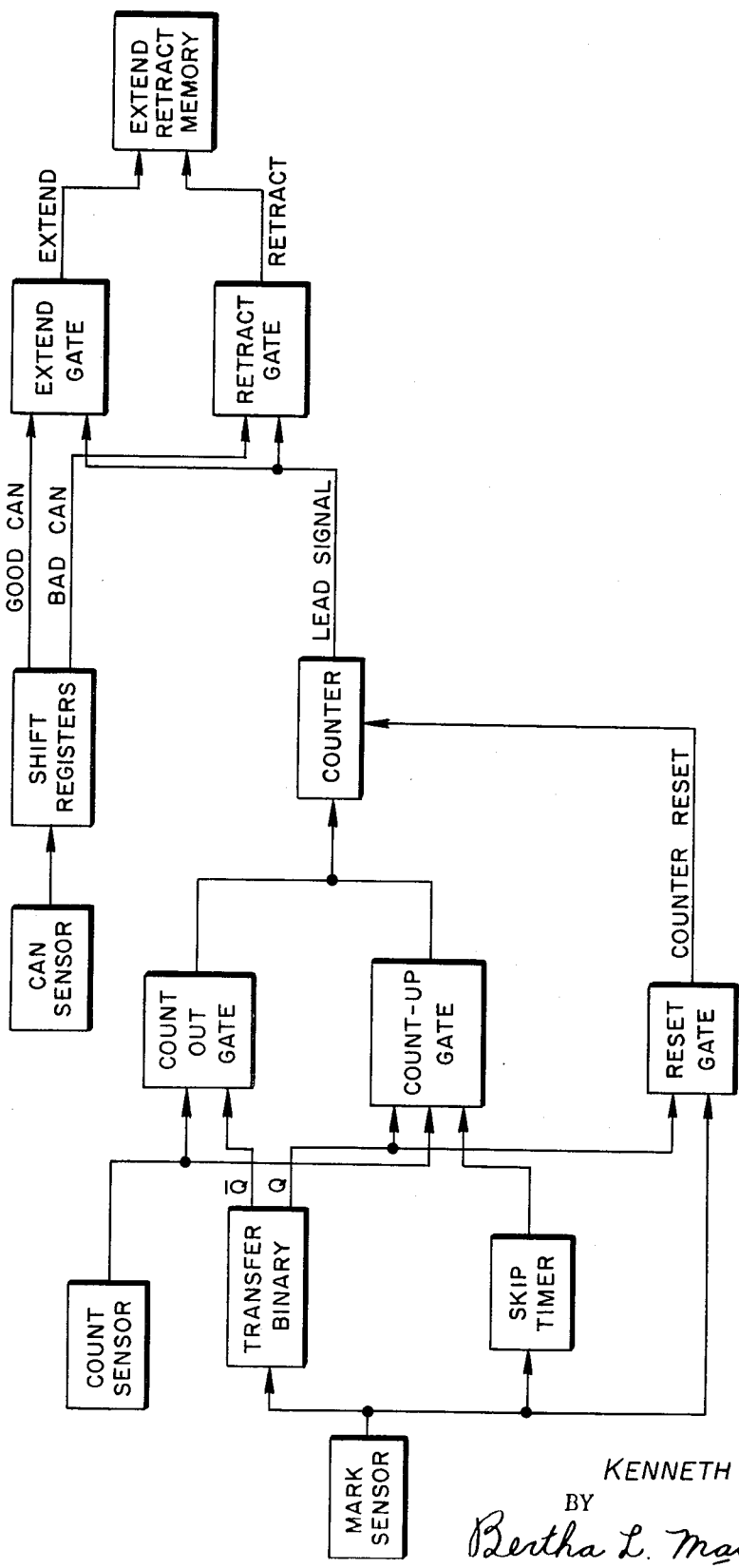

ELECTRICAL CONTROL SYSTEM

This invention relates to an electrical control system for controlling the operation of machines which perform operations on successively fed workpieces which must be placed in proper predetermined positions in order to prevent malfunction of the machine. The main object of the invention is to skip operation of the machine on an improperly positioned workpiece or a workpiece free holder without interrupting the machine operation on following workpieces. The system provides control signals to a solenoid or a plurality of solenoids for the purpose of automatically retracting or otherwise actuating certain mechanisms in the machine before an improperly placed workpiece or a workpiece free holder reaches the site in which a machine operation thereon normally would take place. The timing of the signals required for this purpose is automatically synchronized with the variable speed of operation of the machine.

The invention may be embodied in various kinds of machines, but is shown and described herein as an electrical control system for can printing machines where the system functions to assure proper mandrel skip and can blow-off through a wide speed range. The control system may be embodied in a continuous printer comprising a constantly rotated mandrel wheel and printer wheel, such as shown and described in U.S. Pat. No. 3261,281, in which cans are automatically successively pushed onto mandrels moving in an annular path to come into print-receiving contact with printing blankets retractably mounted on a rotating printer drum.

When the control system is embodied in a can printing machine, the object is to retract a printing blanket which, if unretracted, would print an improperly positioned can, or print the can-holding mandrel in the absence of a can. A further object is to also retract an overcoat roller which applies lacquer to printed cans.

In the operation of can printing machines, as well as other kinds of machines, factors exist which make it necessary to employ different operating speeds. One such factor, for example, is the availability of cans from a supply to be printed. Rather than interrupt the operation of the machine, the speed of rotation of the mandrel wheel and the printing wheel may be slowed to conform to the rate at which cans are being supplied to the machine. Changes in the speed of rotation for any reason require automatic variation in the performance of the electrical control system, in order to give the required "lead" or advance signal to the blanket and overcoat retracting mechanisms in the event an improperly positioned can or a can-free mandrel has been sensed by the system.

Each of the retract mechanisms has a specific mass whose inertia must be overcome to avoid contact of a printing blanket with a can-free mandrel or with an improperly positioned can on a mandrel, referred to as a "bad can" mandrel. The time required for a blanket to be retracted is a constant factor, but the "lead" time preceding the giving of the retract signal varies according to the speed of operation of the machine.

The main object of this invention, therefore, is to provide an electrical control system which automatically varies the "lead" time that is provided at different speeds between the "bad can" signal and the "blanket retract" signal, this object being achieved by means in the system for automatically measuring the speed of operation and then computing the "lead" time required between a "bad can" signal and "blanket retract" signal.

Each can is checked by a can sensor for proper positioning on its respective printing mandrel. If improper positioning is sensed or if the absence of a can is sensed, a "bad can" signal is registered into the memory system. This information is shifted down an appropriate number of mandrel stations to a point where a "blanket retract" signal is issued which causes the printing blanket to retract to allow the bad can mandrel to pass without being printed. When the bad can mandrel has passed the blanket printing area, a "blanket extend" signal is issued which causes the blanket retract mechanism to extend in preparation for printing the next can.

For retracting the overcoat roller, the bad can signal registered into the system is shifted down the required number of mandrel stations from the can check station to a point where an "overcoat retract" signal is issued which causes the overcoat roller to retract to allow the bad can mandrel to pass without being overcoated. When the bad can mandrel has passed the overcoat printing area, an "overcoat extend" signal is issued which causes the overcoat unit to extend in preparation for lacquering the next can.

The bad can signal for the overcoat unit continues to be shifted down to a point where the "can blow-off" signals are issued in sequence to the pilot solenoids on the blow-off mechanism which results in the bad can being thrown clear of its respective transfer rod in a printer of the type referred to in the aforementioned patent.

In order to automatically synchronize the control system with the existing speed of operation of the machine to which it has been applied, the system includes a timing wheel by which the speed of rotation of the printer is measured and the "lead" time is computed, the data being stored in the system in advance of initial contact of the mandrel with a blanket of the printer wheel. As a result of the speed check, the lead time required for the retract signal is computed, and in the event of a bad can the lead signal is released as a blanket retract signal in the mandrel station just preceding initial contact between the bad can mandrel and blanket. An "extend" signal is then given one station later, hence completing the skip.

In addition to the "blanket retract," "blanket extend," "overcoat retract," "overcoat extend" and "can blow-off" signals provided in the system of my invention, additional controls for infeed tracks, machine shut downs and other conditions may be made parts of the system, without affecting the operation of the herein described control features.

In the drawings:

FIG. 5 is a diagrammatic view of parts of a mandrel wheel and a can printing wheel, and of an overcoating wheel.

FIG. 6 is a chart which shows the number of timer wheel speed indicating slugs counted by the control system at different speeds of the machine, referred to as the "count-up", and the number of "lead time" slugs counted by the control system for the corresponding speeds, referred to as the "count-out," for both blanket and overcoat control.

FIG. 7 is a block diagram of the lead computation system.

Figure 1:
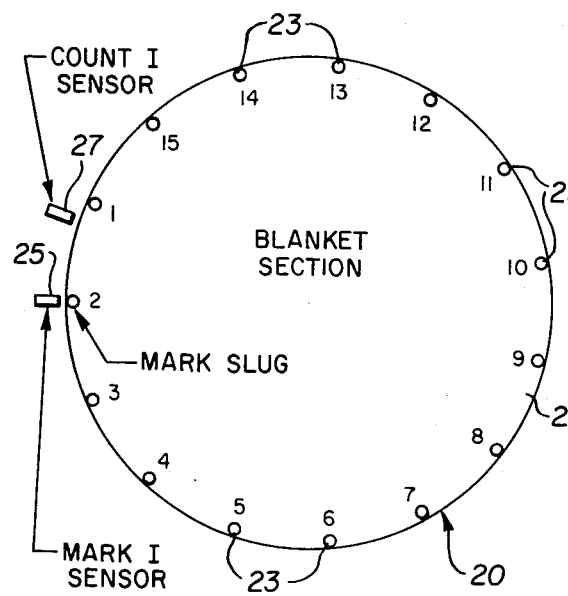
FIG. 1 is an elevational view of the blanket section of a two section timing wheel which is part of the electrical control system of my invention.

In the embodiment of the invention shown in the drawings, cans 10 are automatically placed on mandrels 11 rotatably mounted on a mandrel wheel 12. A printing wheel 13 is provided with a plurality of pivotally mounted printing blankets 14 which successively move into printing contact with cans 10 on the mandrel wheel.

Figure 4:
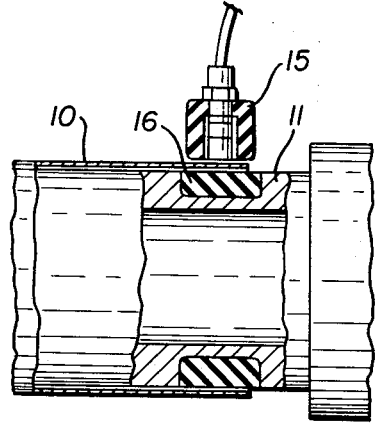
FIG. 4 is an elevational view, partly in section, on an enlarged scale, showing parts of a mandrel and can, and a can sensor in proximity to the can.

A can sensor 15 is a proximity sensor located adjacent the mandrels 11 to scan each can 10 on its mandrel as it passes the sensor. As shown in FIG. 4, each mandrel 11 is provided with a non-metallic ring 16 embedded in the peripheral surface of the metallic mandrel near its inner end to be exposed to the sensor 15 in the event a can 10 is not positioned sufficiently forwardly on the can or in the event there is no can on the mandrel, resulting in a "no can sensed" condition causing the sensor to set a "bad can" signal into memory in the logic equipment of the system.

Each mandrel is referred to herein as a mandrel station. The can sensor 15 is located more than two mandrel stations ahead of the first contact between a can 10 and a printing blanket 13, as shown in FIG. 5. Thus a "bad can" signal is sent to the control system to initiate a speed check by the "count-up" and a "lead" time by the "count-out" technique to be described hereinafter.

An overcoat roller 17 is located several mandrel stations beyond the point of first contact between a can and a blanket.

Figure 2:
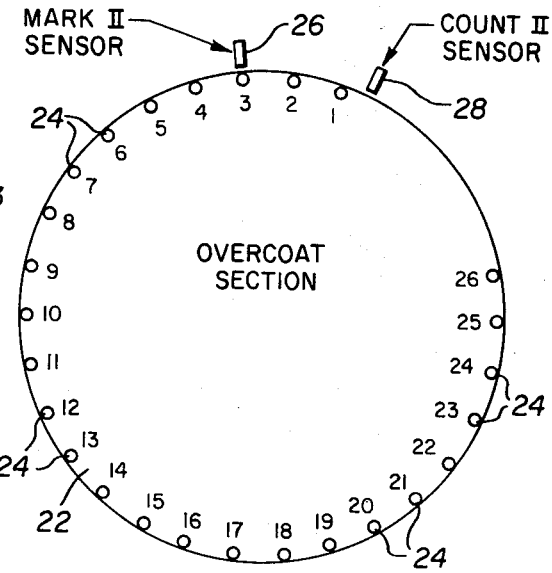
FIG. 2 is an elevational view of the overcoat section of the timing wheel of FIG. 1.
Figure 3:
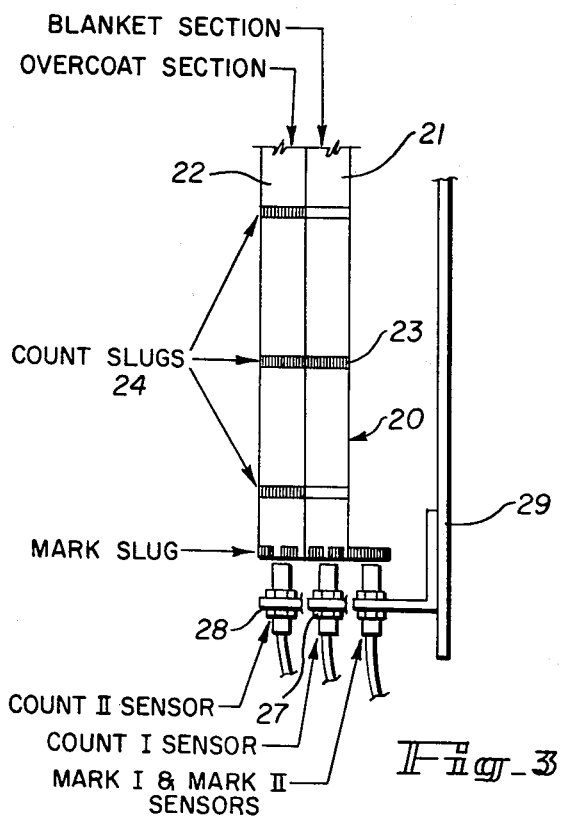
FIG. 3 is a peripheral view of part of the timing wheel of FIGS. 1 and 2.

A timing wheel 20 shown in FIGS. 1-3 comprises a blanket section 21 and an overcoat section 22. The timing wheel synchronizes the logic system with the mechanical drive of the printing machine. The timing wheel makes one revolution per mandrel station. The blanket section 21 has fifteen slugs 23 equi-distantly spaced about its circumference, and the overcoat section 22 has 26 slugs 24 spaced about its circumference in the ratio of two for each of the first thirteen slugs 23 on the blanket section 21. The timing wheel and slugs may be made of any suitable contrasting material which enables the slugs to be counted by the sensing means and counters described herein. The timing wheel is geared to the printer.

A skip timer (FIG. 7) provides a timing pulse during each revolution of the timing wheel, determined by the response time of the mechanism controlled by the system of this invention. In a can printing machine, the controlled mechanism is used to retract a printing blanket on a blanket wheel for which the required time is 80 milliseconds for the can printing blanket section and 40 milliseconds for the overcoat section. The timer interval and the spacing of the slugs on the timing wheel are directly related to the response time of the retract mechanism referred to, or other mechanism controlled by the system.

Reference pulses from two proximity sensors 25 (Mark I) and 26 (Mark II) are generated with each revolution of the timing wheel 20. The Mark I signal occurs at the point of first contact of any mandrel with its respective printing blanket 13. The Mark II signal occurs at the point of first contact between any mandrel and the overcoat roller 17. These pulses are obtained from a single slug passing two proximity sensors located adjacent the timing wheel. Two count sensors, namely, sensor 27 (Count I) and sensor 28 (Count II) are located adjacent the timing wheel 20 to sense the passage of the slugs 23 and 24, respectively. The pulse train developed from the Count I sensor is used by the blanket skip section 21 to determine the required lead. The Count II sensor serves the same function for the overcoat skip section 22. The sensors are mounted on a mounting bracket 29.

When a bad can has been registered into the can check memory by sensor 15, it is then entered into two independent sets of shift registers by sensor 25, the Mark I signal. One set of shift registers is connected to the blanket skip section and the other is connected to the overcoat skip section and the can blow-off section (not shown). The skip section computes the required "lead" signal as a function of printer speed by using the "count-up/count-out" technique which covers two mandrel stations.

The count-up phase, during the first mandrel station, measures the machine speed. The count-out phase, during the second station, generates the required lead signal corresponding to that speed. In order to perform this operation on all mandrels, two counters are required. Thus, while one counter is in the count-up phase, the other is in the count-out phase. This alternating action results in a lead signal being generated for each mandrel. The counters are identical; their capacity is equal to the number of slugs on the timing wheel (15 counts for the blanket section 21 and 26 counts for the overcoat section 22). Output from a counter in the count-out phase constitutes the lead signal.

The count-up or speed check phase of the system occurs during each revolution of the timer wheel as it passes one mandrel station, the count-out or lead signal generation phase of the system occurs during each revolution of the timer wheel as it passes the next mandrel station. The number of slugs 23 counted during the count-up phase gives a measure of the machine speed. The greater the speed, the greater the number of slugs passed and counts placed in storage in the counter during the time the timer is on while the timing wheel passes the first mandrel station. While the timing wheel in its next revolution passes the second mandrel station, slugs 23 on the timing wheel are again counted until that count, added to the counts stored in the counter (while the timing wheel passed the first mandrel station during the time the timer was on) equals the output of the timing wheel. The second or "count-out" phase thus constitutes the "lead" time, the end of which signals the giving of the blanket retract signal. Thus the greater the machine speed, and the lesser the number of counts stored during the timer wheel revolution while passing the second mandrel station, the earlier the retract signal is given in that phase, to compensate for the speed at which the first contact between blanket and mandrel would occur if the blanket were not retracted in time by the giving of the retract signal.

Two identical sets of counter input gates, each one connected to one of the skip counters, are employed. A reset gate produces reset pulses to a counter every other mandrel station at the occurrence of the mark signal. A count-up gate controls count pulses to a counter during the count-up phase. A count-out gate controls pulses to a counter during the count-out phase. Transfer binary is toggled by the trailing edge of the Mark signal to place the count input gates in the count-up or count-out mode. The skip timer, actuated by the trailing edge of the Mark signal, provides a timing pulse each revolution of the timing wheel (80 milliseconds for the blanket section and 40 milliseconds for the overcoat section).

The operation of the skip section through one count-up/count-out phase will be described, using only one counter with its associated gates. Operation of the companion counter is exactly the same except that it will be one step out of phase. In other words, each counter performs successively the count-up and the count-out functions; while one counter is in the count-up phase, the other is in the count-out phase. FIG. 7 shows the electrical control circuit as applied to one counter. The circuit for the other counter is a duplicate of the one shown.

The initial condition for entering the count-up phase requires the transfer binary to be "on" thus enabling the reset gate. The appearance of the Mark signal results in a "reset" being issued from the reset gate, causing the skip counter to be set to zero. The disappearance of the Mark signal causes the transfer binary to be switched off and the timer to be switched on, which enables the count-up gate. The transfer binary being switched off disables the reset gate and the count-out gate. Count pulses enter the skip counter through the count-up gate for the duration of the timer. When the timer turns off, no further count pulses can enter the counter during this phase. The number of counts placed into storage during the timer period gives a measure of machine speed. The greater the speed, the greater the number of counts placed in storage.

The count-out phase is initiated by the appearance of the next Mark signal, but this does not cause a reset since the reset gate is disabled by the transfer binary being off. The disappearance of the Mark signal causes the transfer binary to switch on, which enables the reset gate and the count-out gate and disables the count-up gate. The timer is also switched on, but this has no effect since the count-up gate is disabled. Count pulses enter the skip counter through the count-out gate until the present count has been reached. At this point the counter will have an output which is the lead signal. Thus the number of counts required to count out the counter during the second phase is the lead. Total counts less the count-up equals the count-out.

In other words, the greater the speed the lesser the lead or "waiting" counts before the blanket retract signal is given during the revolution of the timing wheel as it passes the second mandrel station.

The foregoing descriptions of the count-up and the count-out phases apply to both the blanket and overcoat sections.

The output of the skip section and the shift register is connected into a retract-extend circuit which is comprised of an extend gate, a retract gate and an extend/retract memory. The extend gate is connected to the output of the skip section counter and to the "good can" output of the shift register. Thus, if the shift register is indicating good cans, the gate will produce an "extend" signal each time the skip section issues a lead signal. The retract gate is connected to the output of the skip section counter and to the "bad can" output of the shift register. When a bad can appears on the output of the shift register, the gate is enabled and issues a "retract" signal when the lead signal appears. The output of the extend gate is connected to the ON input of the memory, and the output of the retract gate is connected to the OFF input of the memory.

The chart, FIG. 6, illustrates the operation of the control system as applied to a can printing machine. When the printer is operating at high speed, printing 700 cans per minute, the count-up (speed measurement) is 14 slugs on the timing wheel while the wheel is passing the first mandrel station; and the count-out is only 1 for the blanket retract signal and 12 counts for the overcoat retract signal while the timing wheel is passing the next mandrel station just preceding the mandrel station where the contact occurs between blanket and mandrel. Thus the exact time for giving the retract signal for both blanket and overcoat roller is synchronized with any speed of operation of the printer.

In a can printing machine, the can blow-off section does not incorporate a lead factor as do the blanket and overcoat sections, and its control does not affect the operation of the system claimed herein.

Solenoid circuits connecting the control system to the particular machine it is designed to control will vary accordingly, and need not be described since they do not affect the operation of the system.

The timing wheel 20 has been described herein, in its preferred form as making one complete revolution while passing one workpiece station and a second revolution while passing the next workpiece station; the first revolution for measuring the speed of operation of the machine, and the second revolution for measuring the lead time and generating a skip signal at the end of the lead time. However, it may be desirable to alter the speed of rotation of the timing wheel, and for this purpose the timing wheel can be divided into a number of equal segments, with a Mark slug preceding each segment. For example, if it were desired to operate the timing wheel at slower speed, so as to make only a half revolution while passing one workpiece station, two sets of slugs 23, 24, would be used, each set spaced over 180 degrees of the circumference of the wheel instead of 360 degrees as shown, and a mark sensor 25 and count sensor 27 located adjacent each side of the timing wheel in the same relationship to slugs as shown herein. Thus one revolution of the timing wheel may represent as many workpiece stations as segments of the wheel. More precise computations are possible as the number of segments is reduced. Hence the optimum condition for precision exists when the timing wheel makes one complete revolution per workpiece station. It is also to be understood that "slugs" as used herein to describe the parts 23, 24, is intended to include any devices which can be counted by electrical means well known in the art.

I claim:

1. In an electrical control system for automatically controlling operations on successively fed workpieces in a variable speed machine, the improvement which comprises a. a workpiece scanning sensor electrically connected in the control system located for scanning successively moving workpieces and generating a signal when an abnormal condition is sensed, b. a rotating timing wheel geared into the drive mechanism of the variable speed machine, provided with one or more sets of electrically countable devices, each set consisting of a predetermined number of said countable devices equi-spaced apart circumferentially on the wheel or a segment thereof, said wheel revolving at a speed which causes a set of said devices to pass one workpiece station in one revolution of the wheel or a predetermined part of one revolution of the wheel depending on the number of sets of said devices on the wheel, c. a proximity mark sensor electrically connected in the control system located adjacent the timing wheel at a point preceding each set of countable devices, d. A count sensor electrically connected in the control system located adjacent the timing wheel to sense the passage of said devices relatively to a workpiece station, e. a timer electrically connected in the system between the mark sensor and counters defined by elements (g) and (h) hereof, f. a transfer binary electrically connected in the system between the mark sensor and said counters, g. a counter connected to the transfer binary, the timer, the mark sensor and the count sensor, enabled by the transfer binary to be in the count-up phase, for counting the timing wheel devices of one set which pass one workpiece station during the time the timer is on to measure the speed of operation of the machine, and h. a counter connected to the transfer binary, the timer, the mark sensor and the count sensor, enabled by the transfer binary to be in the count-out phase, for counting the timing wheel devices of the same set which pass a second workpiece station until that count added to the counts stored in the count-up phase equal the output of the timing wheel to measure the lead time and for generating a signal at the end of the lead time.

2. The control system defined by claim 1, in which the timing wheel is provided with one or more sets of said countable devices on opposite sides of the wheel, the number of said devices in each set on one side of the wheel being greater than the number of said devices in each set on the opposite side of the wheel.

3. The control system defined by claim 1, in which the countable devices are slugs mounted in the peripheral surface of the timing wheel.

4. In an electrical control system for automatically skipping operations on successively fed workpieces in the event of malfunction in a variable speed machine, the improvement which comprises a. a workpiece scanning sensor electrically connected in the control system located for scanning successively moving workpieces and generating a signal when an abnormal condition is sensed, b. a rotating timing wheel geared into the drive mechanism of the variable speed machine, provided with a predetermined number of equi-spaced circumferentially located slugs which makes one revolution while passing each workpiece station, c. a proximity mark sensor electrically connected in the control system located adjacent the timing wheel for providing a signal at the point of first contact between a workpiece and a part of the machine designed to perform an operation on the workpiece, d. a count sensor electrically connected in the control system located adjacent the timing wheel to sense the passage of slugs on the timing wheel, e. a timer electrically connected in the system between the mark sensor and counters defined by elements (g) and (h) hereof, f. a transfer binary electrically connected in the system between the mark sensor and said counters, g. a counter connected to the transfer binary, the timer, the mark sensor and the count sensor, enabled by the transfer binary to be in the count-up phase, for counting the timing wheel slugs which pass one workpiece station in one revolution of the wheel during the time the timer is on to measure the speed of operation of the machine, and h. a counter connected to the transfer binary, the timer, the mark sensor and the count sensor, enabled by the transfer binary to be in the count-out phase, for counting the timing wheel slugs which pass a second workpiece station in the next revolution of the wheel until that count added to the counts stored in the count-up phase equal the output of the timing wheel to measure the lead time and for generating a skip signal at the end of the lead time.

5. The control system defined by claim 4, in which the timing wheel is provided with said slugs on opposite sides of the wheel, the number of slugs on one side of the wheel being greater than the number of slugs on the opposite side of the wheel.

6. The control system defined by claim 4, in which the slugs are mounted in the peripheral surface of the timing wheel.

7. In an electrical control system for automatically skipping operations on successively fed cans on a rotating mandrel wheel in the event of malfunction in a variable speed can printing machine provided with a rotating printer blanket wheel, the improvement which comprises a. a can scanning sensor electrically connected in the control system located for scanning successively moving cans on a mandrel wheel and generating a bad can signal when an abnormal condition is sensed, b. a rotating timing wheel geared into the drive mechanism of the variable speed printing machine provided with a predetermined number of equi-spaced circumferentially located slugs which makes one revolution for each mandrel station, c. a proximity mark sensor electrically connected in the control system located adjacent the timing wheel for providing a signal at the point of first contact between a can on a mandrel and a printing blanket on the blanket wheel, d. a count sensor electrically connected in the control system located adjacent the timing wheel to sense the passage of slugs on the timing wheel, e. a timer electrically connected in the system between the mark sensor and counters defined by elements (g) and (h) hereof, f. a transfer binary electrically connected in the system between the mark sensor and said counters, g. a counter connected to the transfer binary, the timer, the mark sensor and the count sensor, enabled by the transfer binary to be in the count-up phase, for counting the timing wheel slugs which pass one mandrel station in one revolution of the wheel during the time the timer is on to measure the speed of operation of the printing machine, and h. a counter connected to the transfer binary, the timer, the mark sensor and the count sensor, enabled by the transfer binary to be in the count-out phase, for counting the timing wheel slugs which pass a second mandrel station in the next revolution of the wheel until that count added to the counts stored in the count-up phase equal the output of the timing wheel to measure the lead time and for generating a skip signal at the end of the lead time.

8. The control system defined by claim 7, in which the timing wheel is provided with slugs on opposite sides of the wheel, the number of slugs on one side of the wheel being greater than the number of slugs on the opposite side, the slugs on one side being counted for controlling the operation of the rotating printer blanket wheel, and the slugs on the opposite side being counted for controlling the operation of an overcoat roller in a subsequent step of operation of the printing machine.

* * * * *